US006484384B1

United States Patent
Gibson et al.

(10) Patent No.: US 6,484,384 B1
(45) Date of Patent: Nov. 26, 2002

(54) METHOD OF MANUFACTURING AN AXIALLY COLLAPSIBLE DRIVESHAFT ASSEMBLY

(75) Inventors: Daniel W. Gibson, Maumee; Christopher C. Cheney, Bowling Green, both of OH (US); Daniel C. Perry, Temperance, MI (US)

(73) Assignee: Spicer Driveshaft, Inc., Holland, OH (US)

(*) Notice: Subject to any disclaimer, the term of this patent is extended or adjusted under 35 U.S.C. 154(b) by 0 days.

(21) Appl. No.: 09/476,475

(22) Filed: Dec. 30, 1999

Related U.S. Application Data
(60) Provisional application No. 60/114,733, filed on Dec. 31, 1998.

(51) Int. Cl.[7] .......................... B21D 39/00; B23P 11/00
(52) U.S. Cl. ...................... 29/516; 29/419.2; 29/421.1; 29/523; 72/56; 72/58; 72/61
(58) Field of Search .................. 29/421.1, 507, 29/508, 516, 523, 419.2, 897.2; 72/56, 61, 62, 370.06, 370.22, 58

(56) References Cited

U.S. PATENT DOCUMENTS

| | | | | |
|---|---|---|---|---|
| 2,102,325 A | * | 12/1937 | Kylstra ........................ 29/516 |
| 2,199,926 A | | 5/1940 | Swennes | |
| 3,088,200 A | | 5/1963 | Birdsall et al. | |
| 3,251,974 A | | 5/1966 | Seyfried | |
| 3,293,884 A | | 12/1966 | Grob | |
| 3,348,396 A | | 10/1967 | Veaux et al. | |
| 3,372,564 A | | 3/1968 | Crowdes | |
| 4,125,000 A | | 11/1978 | Grob | |
| 4,177,654 A | | 12/1979 | Aucktor | |
| 4,330,924 A | * | 5/1982 | Kushner et al. ............... 29/508 |
| 4,513,488 A | | 4/1985 | Arena ........................ 29/516 |
| 4,572,022 A | | 2/1986 | Mettler | |
| 4,622,022 A | * | 11/1986 | Diffenderfer et al. ....... 464/162 |
| 4,738,154 A | | 4/1988 | Hancock | |
| 4,991,871 A | * | 2/1991 | Sadakata ...................... 28/777 |
| 5,022,135 A | * | 6/1991 | Miller et al. ................ 29/421.1 |
| 5,235,734 A | | 8/1993 | DuRocher et al. | |
| 5,253,947 A | | 10/1993 | Petrzelka et al. | |
| 5,314,204 A | | 5/1994 | DuRocher et al. | |
| 5,538,474 A | | 7/1996 | Kretschmer et al. | |
| 5,830,071 A | | 11/1998 | Castellon | |
| 5,964,127 A | * | 10/1999 | Steingroever .............. 29/419.2 |
| 6,015,350 A | * | 1/2000 | Breese ........................ 464/162 |

FOREIGN PATENT DOCUMENTS

| | | | | |
|---|---|---|---|---|
| EP | 00-0523361 A | * | 1/1993 | .................... 72/61 |
| GB | 2172376 | | 9/1986 | |
| GB | 2198377 | | 6/1988 | |
| WO | WO 8705639 | | 9/1987 | |

* cited by examiner

Primary Examiner—P. W. Echols
Assistant Examiner—Jermie E. Cozart
(74) Attorney, Agent, or Firm—MacMillan, Sobanski & Todd, LLC

(57) ABSTRACT

A method of manufacturing a collapsible driveshaft assembly includes the steps of disposing an end of a first tube within a forming die having a non-circular cross sectional shape, expanding the end of the first tube into conformance with the die cavity, inserting an end of a second tube is inserted within the deformed end of the first tube, and expanding the end of the second tube into conformance with the end of the first tube. As a result of this expansion, outwardly extending regions and inwardly extending regions of the second tube extend into cooperation with outwardly extending regions and inwardly extending regions of the first tube so as to cause the first and second tubes to function as cooperating male and female splined members. As a result, a rotational driving connection therebetween to form the driveshaft. When a relatively large axial force is applied to the ends of the telescoping driveshaft, the second tube will move axially within the first tube, thereby collapsing and absorbing energy.

10 Claims, 6 Drawing Sheets

METHOD OF MANUFACTURING AN AXIALLY COLLAPSIBLE DRIVESHAFT ASSEMBLY

CROSS REFERENCE TO RELATED APPLICATION

This application claims the benefit of U.S.Provisional Application No. 60/114,733, filed Dec. 31, 1998, the disclosure of which is incorporated herein by reference.

BACKGROUND OF THE INVENTION

This invention relates in general to drive train systems for transferring rotational power from a source of rotational power to a rotatably driven mechanism. In particular, this invention relates to an improved driveshaft assembly for use in such a drive train system that is axially collapsible in the event of a collision to absorb energy and a method for manufacturing same.

Torque transmitting shafts are widely used for transferring rotational power from a source of rotational power to a rotatably driven mechanism. For example, in most land vehicles in use today, a drive train system is provided for transmitting rotational power from an output shaft of an engine/transmission assembly to an input shaft of an axle assembly so as to rotatably drive the wheels of the vehicle. To accomplish this, a typical vehicular drive train system includes a hollow cylindrical driveshaft tube. A first universal joint is connected between the output shaft of the engine/transmission assembly and a first end of the driveshaft tube, while a second universal joint is connected between a second end of the driveshaft tube and the input shaft of the axle assembly. The universal joints provide a rotational driving connection from the output shaft of the engine/transmission assembly through the driveshaft tube to the input shaft of the axle assembly, while accommodating a limited amount of misalignment between the rotational axes of these three shafts.

A recent trend in the development of passenger, sport utility, pickup truck, and other vehicles has been to design the various components of the vehicle in such a manner as to absorb energy during a collision, thereby providing additional safety to the occupants of the vehicle. As a part of this trend, it is known to design the drive train systems of vehicles so as to be axially collapsible so as to absorb energy during a collision. To accomplish this, the driveshaft tube may be formed as an assembly of first and second driveshaft sections that are connected together for concurrent rotational movement during normal operation, yet are capable of moving axially relative to one another when a relatively large axially compressive force is applied thereto, such as can occur during a collision. A variety of such axially collapsible driveshaft assemblies are known in the art.

It has been found to be desirable to design axially collapsible driveshaft assemblies of this general type such that a predetermined amount of force is required to initiate the relative axial movement between the two driveshaft sections. It has further been found to be desirable to design these axially collapsible driveshaft assemblies such that a predetermined amount of force (constant in some instances, varying in others) is required to maintain the relative axial movement between the two driveshaft sections. However, it has been found that the manufacture of such axially collapsible driveshaft assemblies is somewhat difficult and expensive to manufacture than convention non-collapsible driveshafts. Thus, it would be desirable to provide an improved method of manufacturing a driveshaft assembly for use in a drive train system that is relatively simple and inexpensive to perform.

SUMMARY OF THE INVENTION

This invention relates to an improved driveshaft assembly for use in a drive train system that is axially collapsible in the event of a collision to absorb energy and a method for manufacturing same. Initially, an end of a first tube is disposed within a forming die having a die cavity that defines a non-circular cross sectional shape. Then, the end of the first tube is expanded outwardly into conformance with the die cavity, such as by mechanical deformation, electromagnetic pulse forming, hydroforming, and the like. As a result of this expansion, the end of the outer tube is deformed to have the same cross sectional shape as the die cavity, including a plurality of outwardly extending regions and a plurality of inwardly extending regions. Following this expansion, an end of a second tube is inserted within the deformed end of the first tube. Next, the end of the second tube is expanded outwardly into conformance with the end of the first tube, such as by mechanical deformation, electromagnetic pulse forming, hydroforming, and the like. As a result of this expansion, the end of the second tube is also formed having the same non-circular cross sectional shape including a plurality of outwardly extending regions and a plurality of inwardly extending regions. The outwardly extending regions and the inwardly extending regions of the second tube extend into cooperation with the outwardly extending regions and the inwardly extending regions of the first tube, respectively, so as to cause the first and second tubes to function as cooperating male and female splined members. As a result, a rotational driving connection therebetween to form the driveshaft. When a relatively large axial force is applied to the ends of the telescoping driveshaft, the second tube will move axially within the first tube, thereby collapsing and absorbing energy.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
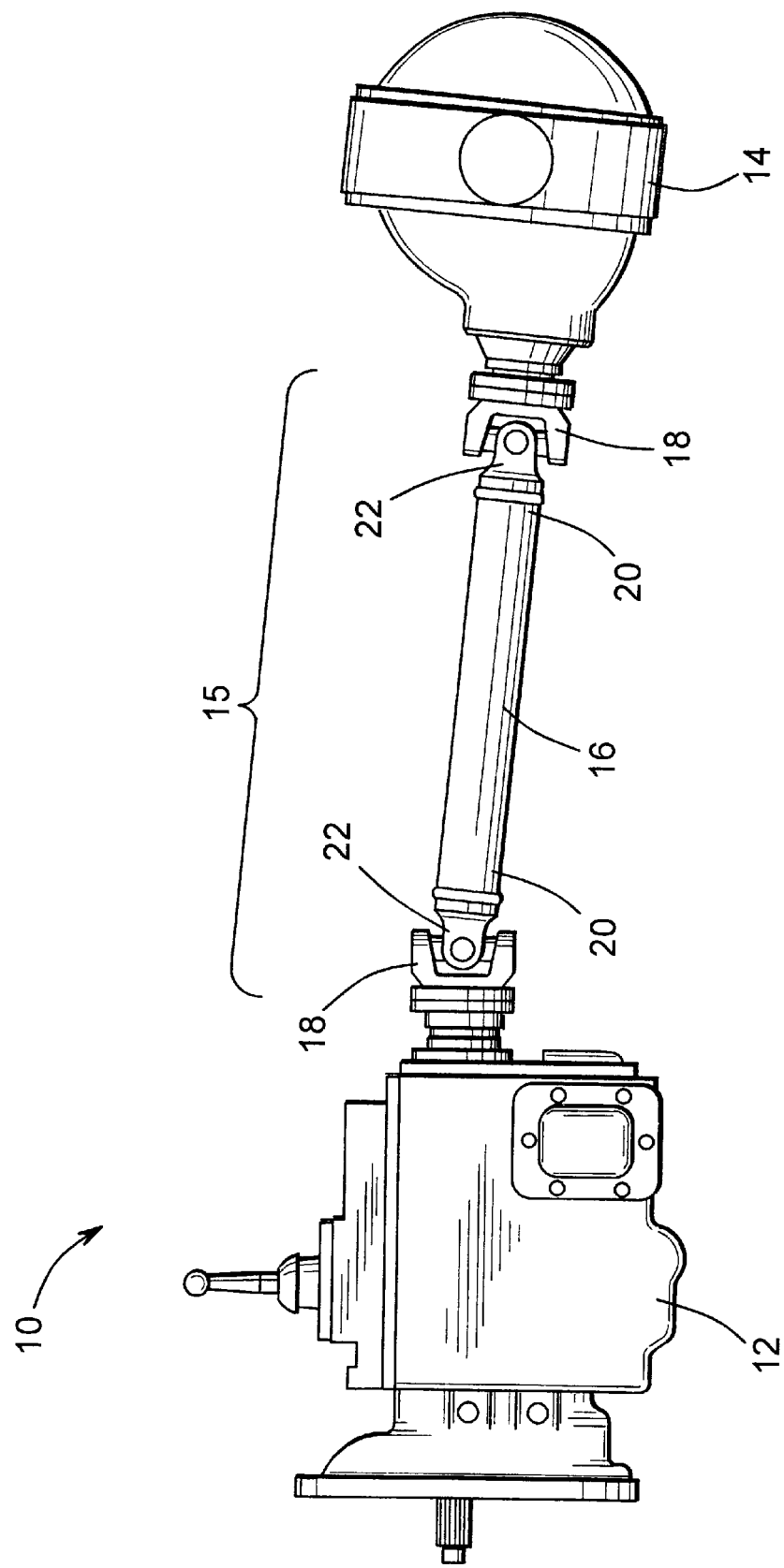
FIG. 1 is a schematic view in elevation of a prior art vehicle drive train assembly.

Referring now to the drawings, there is illustrated in FIG. 1 a vehicle drive train system, indicated generally at 10, that is conventional in the art. The prior art drive train system 10 includes a transmission 12 that is connected to an axle assembly 14 through a driveshaft assembly 15. The driveshaft assembly 15 includes an elongated, cylindrically-shaped driveshaft tube 16. As is typical in conventional vehicle drive train systems 10, the output shaft (not shown) of the transmission 12 and the input shaft (not shown) of the axle assembly 14 are not co-axially aligned. Therefore, universal joints 18 are provided at each end 20 of the driveshaft tube 16 to rotatably connect the driveshaft tube 16 at an angle to the output shaft of the transmission 12 and the input shaft of the axle assembly 14.

The connections between the ends 20 of the driveshaft tube 16 and the universal joints 18 are usually accomplished by a pair of end fittings 22, such as tube yokes or slip yokes. The ends 20 of the driveshaft tube 16 are open and are adapted to receive portions of the end fittings 22 therein. Typically, each end fitting 22 includes a tube seat (not shown) that is inserted into an open end 20 of the driveshaft tube 16. Typically, the end fitting 22 is secured to the driveshaft tube 16 by welding, adhesives, or similar relatively permanent attachment method. Accordingly, torque can be transmitted from the transmission 12 through the first end fitting 22, the driveshaft tube 16, and the second end fitting 22 to the axle assembly 14.

Figure 2:
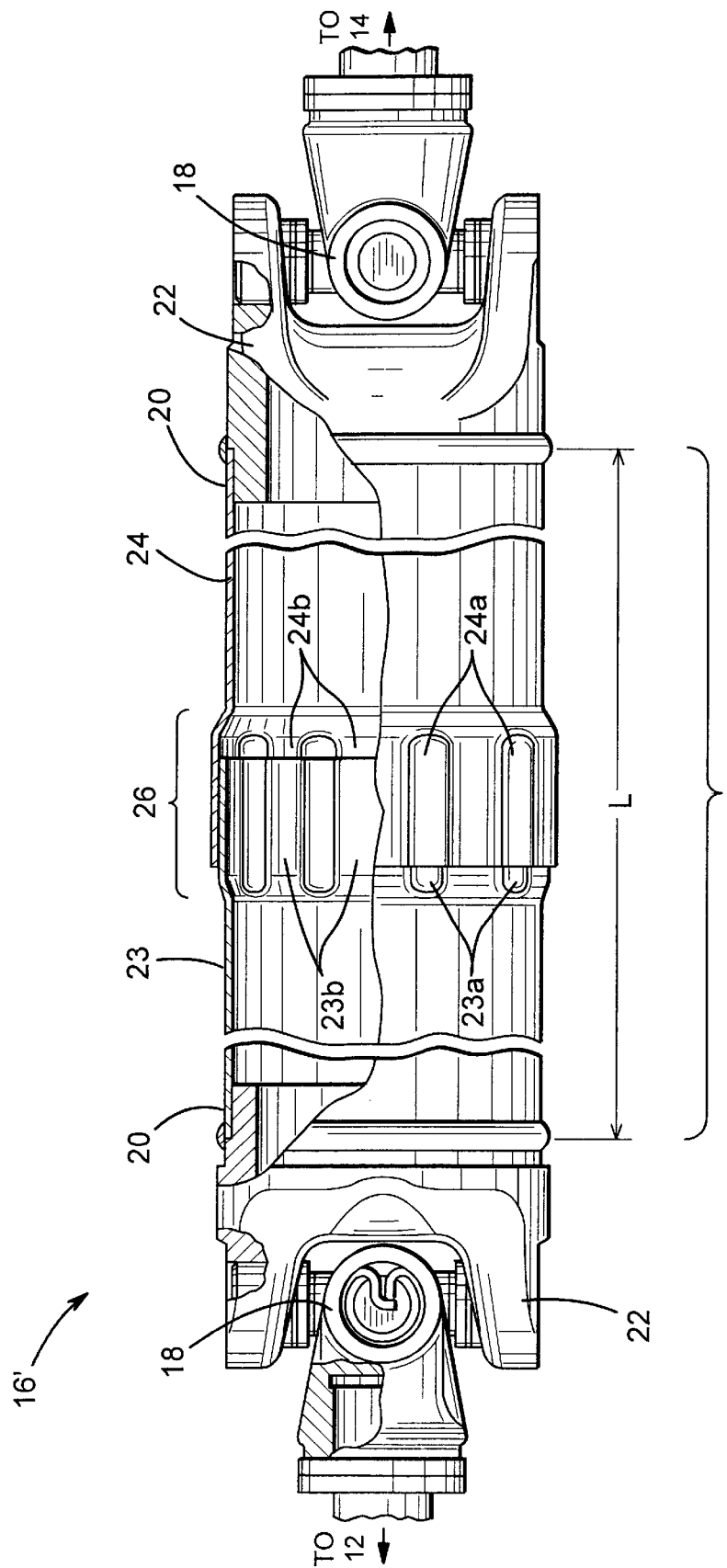
FIG. 2 is an enlarged side elevational view, partially in cross section, of a vehicle driveshaft assembly manufactured in accordance with the method of this invention.

FIG. 2 illustrates an improved structure for a vehicle driveshaft assembly 15' in accordance with this invention. As shown therein, the driveshaft assembly 15' includes a modified driveshaft, indicated generally at 16', that is composed of an inner tube 23 received within an outer tube 24 in an axially overlapping or telescoping manner. In the illustrated embodiment, the inner tube 23 is connected to the front universal joint 18 (i.e. the universal joint 18 that is connected to the output shaft of the transmission 12), while the outer tube 24 is connected to the rear universal joint 18 (i.e. the universal joint 18 that is connected to the input shaft of the axle assembly 14). If desired, however, the inner tube 23 may be connected to the rear universal joint 18, and the outer tube 24 may be connected to the front universal joint 18.

The driveshaft 16' is generally hollow and cylindrical in shape, having an axial length L defined by the distance between the two ends 20 thereof. The overall length L of the driveshaft 16' can be varied in accordance with the vehicle in which it is used. For example, in passenger cars, the overall length L of the driveshaft 16' can be relatively short, such as in the range of from about thirty inches to about fifty inches. In pickup trucks or sport utility vehicles, however, the overall length L of the driveshaft 16' can be relatively long, such as in the range of from about sixty inches to about eighty inches. Each of the inner tube 23 and the outer tube 24 extends for a portion of the total axial length L, with a portion of the outer tube 24 and a portion of the inner tube 23 defining an axially overlapped or telescoping region 26. Portions of the inner tube 23 and the outer tube 24 engage one another within the axially overlapped region 26 to connect them together for concurrent rotational movement during normal operation, yet allow axial movement relative to one another when a relatively large axially compressive force is applied thereto, such as can occur during a collision. The manner in which these portions of the inner tube 23 and the outer tube 24 are formed is described in detail below.

The inner tube 23 and the outer tube 24 of the driveshaft 16' can be formed from any suitable material or combination of materials. Typically, the inner tube 23 and the outer tube 24 of the driveshaft 16' are formed from steel or an aluminum alloy. Other materials, such as fiber reinforced composites or other combinations of metallic or non-metallic materials, may also be used. Preferably, the inner tube 23 and the outer tube 24 of the driveshaft 16' are formed from an aluminum alloy. Suitable methods for forming the inner tube 23 and the outer tube 24 of the driveshaft 16' are well known to persons skilled in the art. In the illustrated embodiment, the inner tube 23 and the outer tube 24 of the driveshaft 16' are both formed having a relatively constant outer diameter. However, if desired, either or both of the inner tube 23 and the outer tube 24 of the driveshaft 16' can be formed having a larger diameter center portion, a pair of end portions having a reduced diameter, and a diameter reducing portion extending between the center and end portions. This type of driveshaft is more fully described in assignee's commonly owned U.S. Pat. Nos. 5,637,042 and 5,643,093, the contents of which are hereby incorporated by reference.

Figure 3:
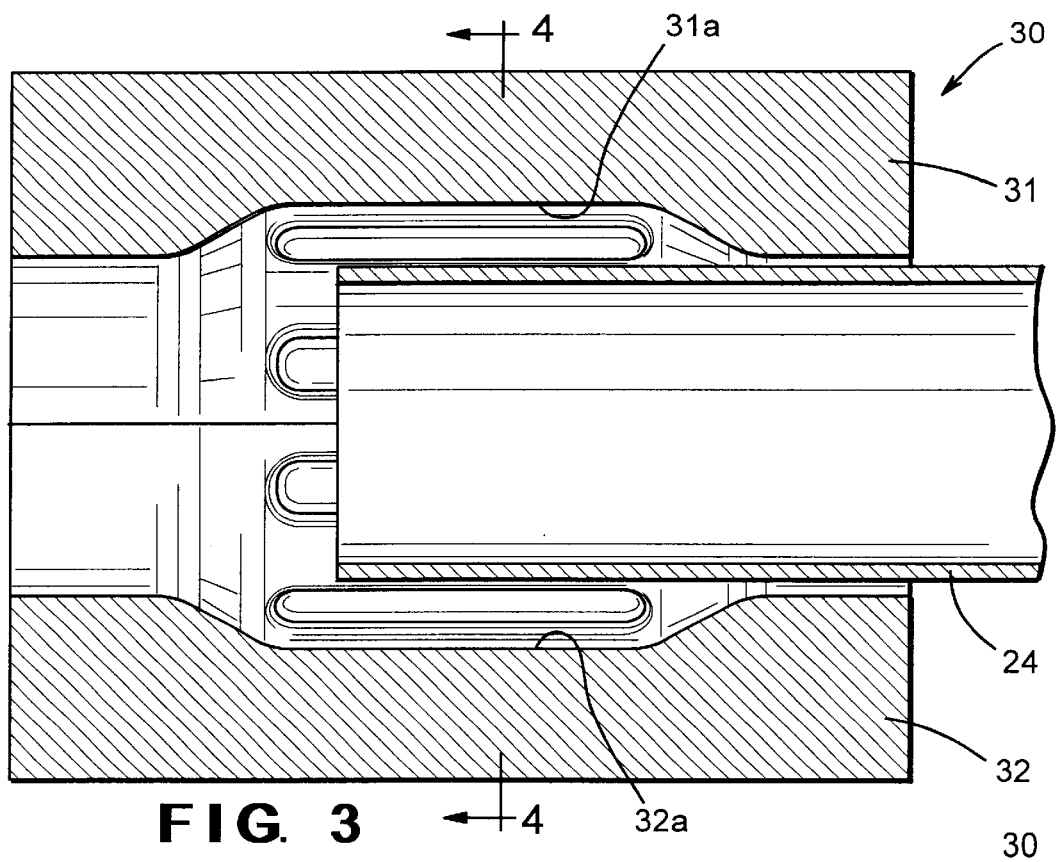
FIG. 3 is a sectional elevational view of a forming die having an end of a first driveshaft section disposed therein prior to deformation.
Figure 4:
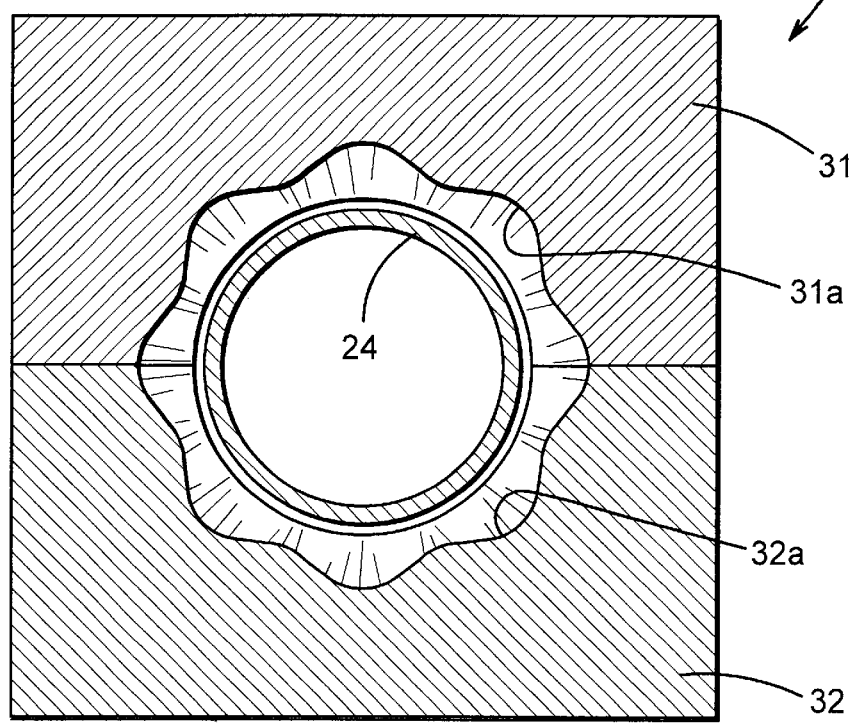
FIG. 4 is a sectional elevational view taken along line 4—4 of FIG. 3.

The method of manufacturing the driveshaft 16' is shown in FIGS. 3 through 10. Initially, as shown in FIGS. 3 and 4, a forming die, indicated generally at 30, is provided. The forming die 30 includes a pair of opposed die sections 31 and 32 that are supported for relative movement between opened and closed positions. The die sections 31 and 32 have cooperating recesses 31a and 32a formed therein which together define an internal die cavity having a desired shape. When moved to the opened position (not shown), the die sections 31 and 32 are spaced apart from one another to allow a workpiece to be inserted within or removed from the die cavity. When moved to the closed position illustrated in FIG. 3, the die sections 31 and 32 are disposed adjacent to one another so as to enclose the workpiece within the die cavity. As best shown in FIG. 4, the die cavity of the forming die 30 has a cross sectional shape that is generally circumferentially undulating. However, the die cavity may be formed having any desired (preferably non-circular, as will become apparent below) cross sectional shape.

Figure 5:
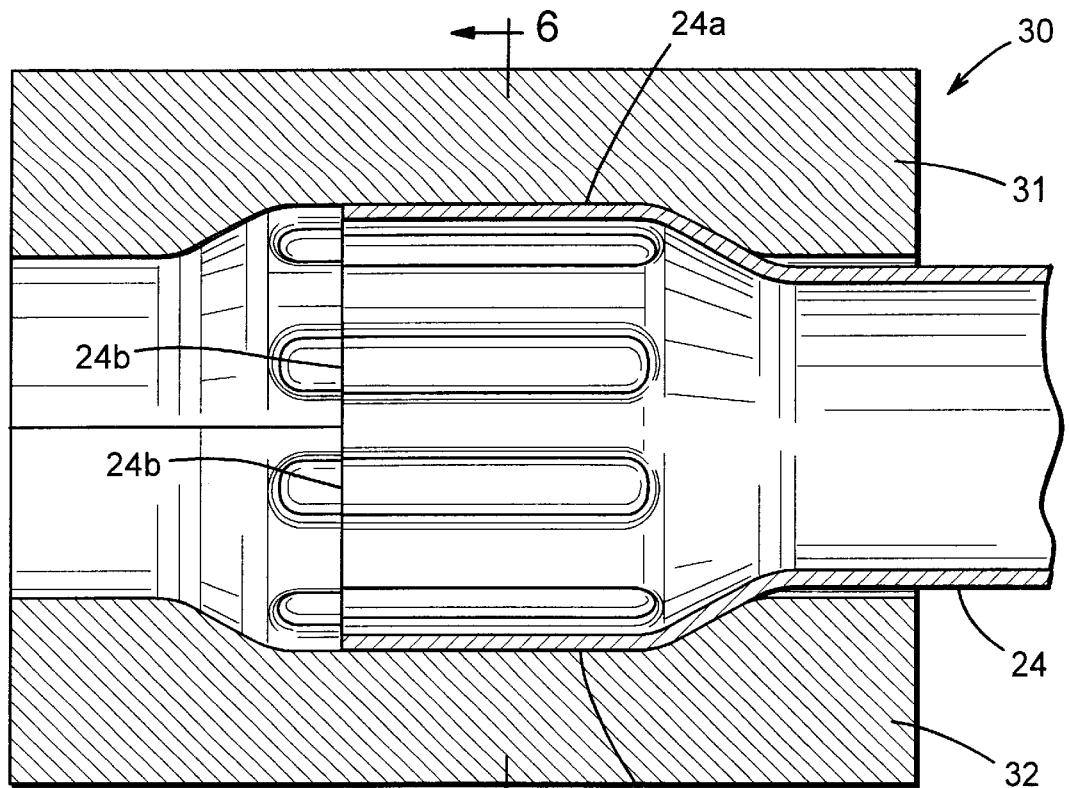
FIG. 5 is a sectional elevational view of the forming die illustrated in FIG. 3 showing the end of the first driveshaft section after deformation.
Figure 6:
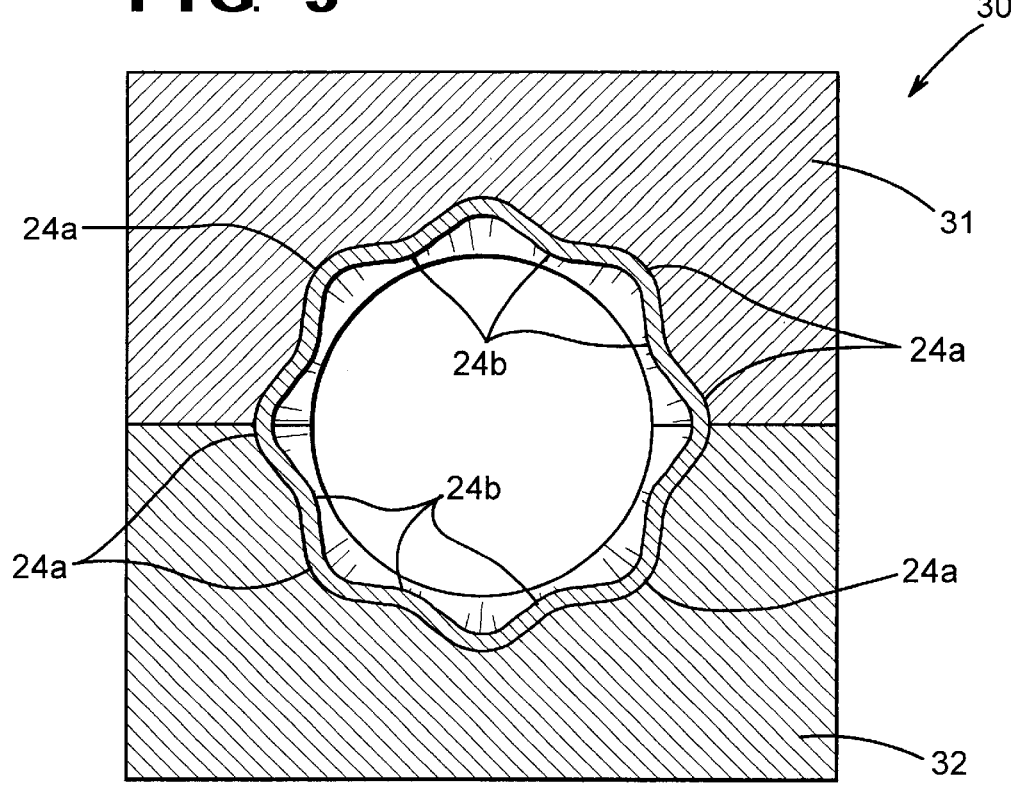
FIG. 6 is a sectional elevational view taken along line 6—6 of FIG. 5.

To begin the manufacturing process, the die sections 31 and 32 are initially moved to the opened position so that an end of the outer tube 24 can be inserted therebetween. Then, the die sections 31 and 32 of the forming die 30 are moved to the closed position about the end of the outer tube 24 as shown in FIGS. 3 and 4. Next, as shown in FIGS. 5 and 6, the end of the outer tube 24 is expanded outwardly into conformance with the die cavity defined by the recesses 31a and 32a of the die sections 31 and 32, respectively. This expansion can be accomplished in any desired manner, such as by mechanical deformation, electromagnetic pulse forming, hydroforming, and the like. As a result of this expansion, the end of the outer tube 24 is formed having a circumferentially undulating cross sectional shape including a plurality of radially outwardly extending regions 24a and a plurality of radially inwardly extending regions 24b. As will become apparent below, the outwardly extending regions 24a and the inwardly extending regions 24b of the end of the outer tube 24 function as a female splined member to provide a rotational driving connection with the inner tube 23.

Figure 7:
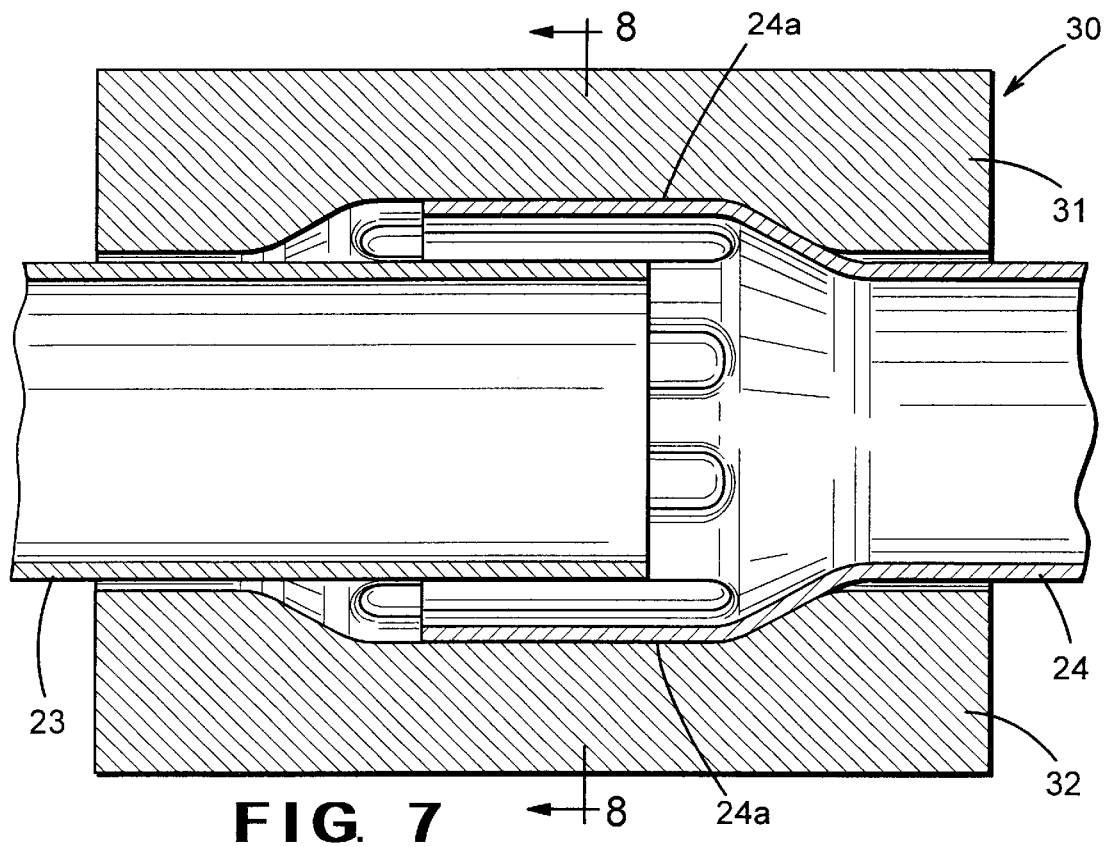
FIG. 7 is a sectional elevational view of the forming die illustrated in FIG. 5 having an end of a second driveshaft section disposed within the end of the first driveshaft section prior to deformation.
Figure 8:
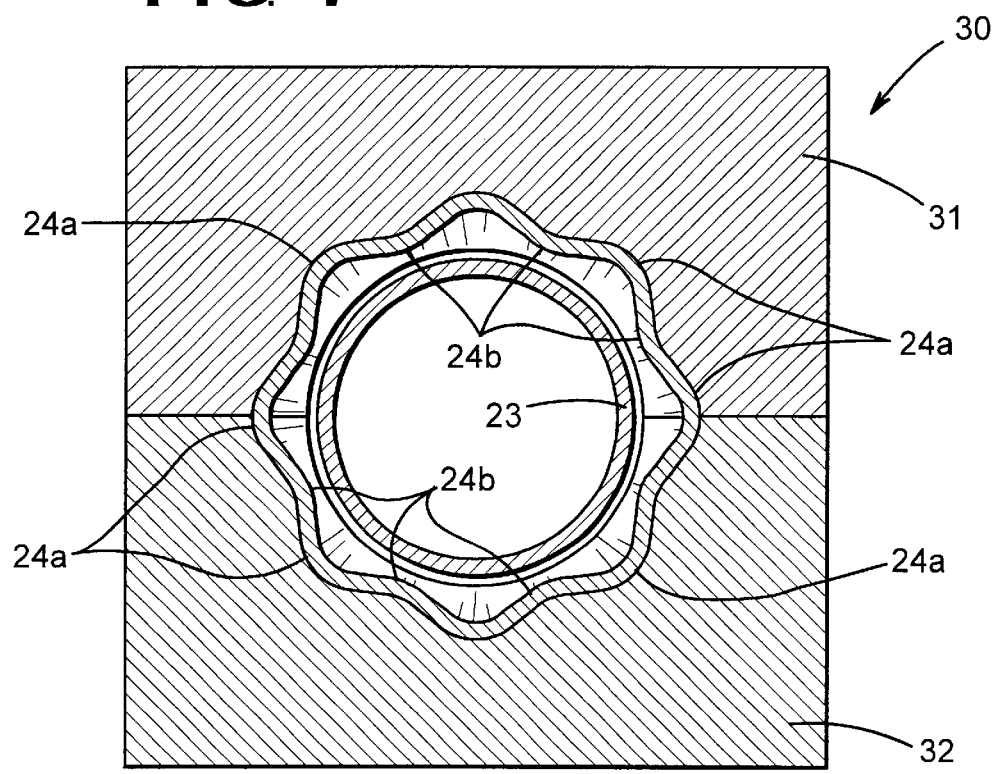
FIG. 8 is a sectional elevational view taken along line 8—8 of FIG. 7.
Figure 9:
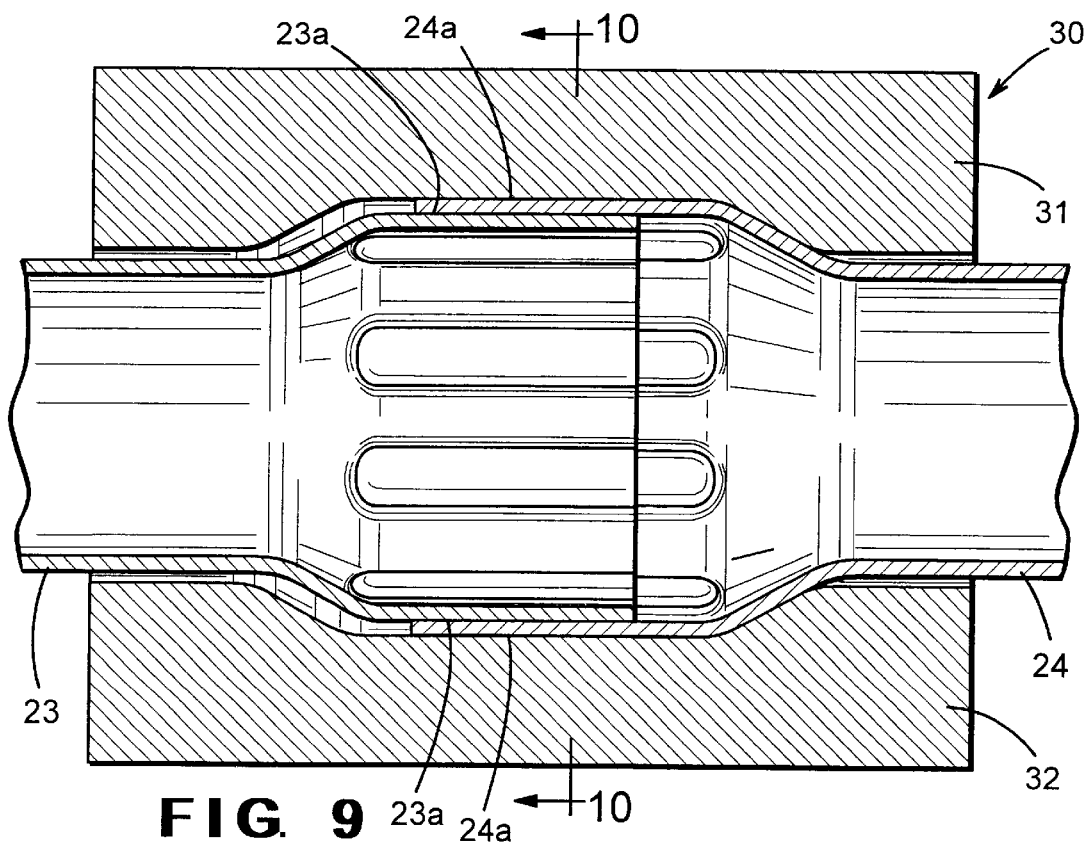
FIG. 9 is a sectional elevational view of the forming die illustrated in FIG. 7 showing the end of the second driveshaft section after deformation.
Figure 10:
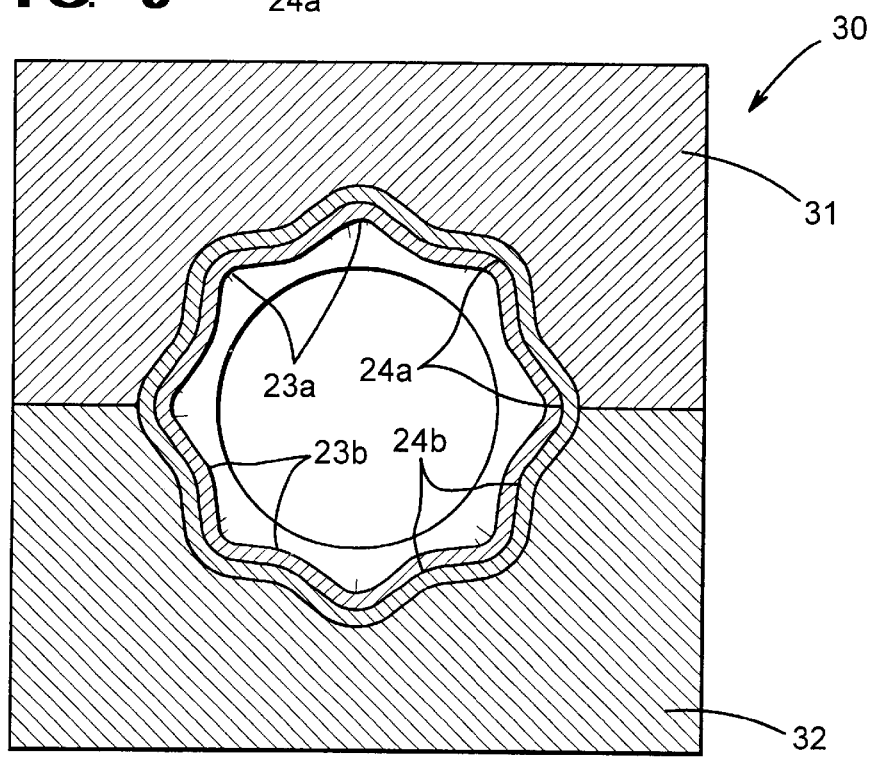
FIG. 10 is a sectional elevational view taken along line 10—10 of FIG. 9.

Following this expansion, an end of the inner tube 23 is inserted within the end of the outer tube 24, as shown in FIGS. 7 and 8. Next, as shown in FIGS. 9 and 10, the end of the inner tube 23 is expanded outwardly into conformance with the end of the outer tube 24. This expansion can also be accomplished in any desired manner, such as by mechanical deformation, electromagnetic pulse forming, hydroforming, and the like. As a result of this expansion, the end of the inner tube 23 is also formed having a circumferentially undulating cross sectional shape including a plurality of radially outwardly extending regions 23*a* and a plurality of radially inwardly extending regions 23*b*. As best shown in FIG. 10, the outwardly extending regions 23*a* of the inner tube 23 extend into cooperation with the outwardly extending regions 24*a* of the outer tube 24. Similarly, the inwardly extending regions 23*b* of the inner tube 23 extend into cooperation with the inwardly extending regions 24*b* of the outer tube 24. Thus, the outwardly extending regions 23*a* and the inwardly extending regions 23*b* of the end of the inner tube 23 function as a male splined member to provide a rotational driving connection with the outer tube 24. It can be seen, therefore, that the inner and outer tubes 23 and 24 function as cooperating male and female splined members, thereby providing a rotational driving connection therebetween.

The outwardly extending regions 23*a* and 24*a* and the inwardly extending regions 23*a* and 23*b* may extend continuously around the entire perimeter of the overlapped region 26, as shown in FIGS. 4, 6, 8, and 10, or around only a portion thereof. Preferably, however, the outwardly extending regions 23*a* and 24*a* and the inwardly extending regions 23*a* and 23*b* are formed around the entire perimeter of the overlapped region 26. The number and configuration of the outwardly extending regions 23*a* and 24*a* and the inwardly extending regions 23*a* and 23*b* may vary depending upon a number of factors, including the torque requirements of the driveshaft 16', the physical sizes of the inner tube 23 and the outer tube 24, and the materials chosen for the driveshaft 16'. However, any number of outwardly extending regions 23*a* and 24*a* and the inwardly extending regions 23*a* and 23*b* may be spaced apart around the entire perimeter of the overlapped region 26 or a portion thereof.

In operation, the outwardly extending regions 23*a* and 24*a* and the inwardly extending regions 23*a* and 23*b* cooperate to form a mechanical interlock between the inner tube 23 and the outer tube 24 that increases the overall torque carrying capacity of the driveshaft 16'. When a relatively large axial force is applied to the ends of the telescoping driveshaft 16', however, the inner tube 23 will be forced to move axially within the outer tube 24. Accordingly, the overall length of the driveshaft 16' collapses or shortens, thereby absorbing energy during this process. Typically, appropriately large axial forces are generated during a front-end impact of the vehicle with another object that cause this collapse to occur.

As discussed above, the method of this invention contemplates that the outer tube 24 will be initially expanded to a desired shape within the forming die 30, then the inner tube 23 will be subsequently expanded to conform with the shape of the outer tube 24. However, it will be appreciated that the method of this invention could be performed in the reverse order. For example, the inner tube 23 could be initially deformed about an internal forming die (defining an external die cavity, so to speak) to a desired shape, followed by the outer tube 24 being compressed to conform with the shape of the inner tube 23. Alternatively, the outer tube 24 and the inner tube 23 can be simultaneously deformed instead of being sequentially deformed as described and illustrated.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A method of manufacturing a driveshaft assembly comprising the steps of:
    (a) disposing an end of a first tube relative to a forming die defining a die cavity;
    (b) deforming the end of the first tube into conformance with the die cavity of the forming die;
    (c) disposing an end of a second tube in an overlapping relationship relative to the deformed end of the first tube; and
    (d) deforming the end of the second tube into conformance with the deformed end of the first tube without further deforming the end of the first tube.

2. The method defined in claim 1 wherein said step (a) is performed by providing a forming die having first and second die sections including respective recesses that cooperate to define an internal die cavity.

3. The method defined in claim 2 wherein said step (a) is performed by initially moving the first and second die sections to an open position, disposing the end of the first tube between the first and second die sections, and moving the first and second die sections to a closed position.

4. The method defined in claim 1 wherein said step (a) is performed by providing a forming die defining a die cavity having a radially inwardly extending portions and radially outwardly extending portions.

5. The method defined in claim 1 wherein said step (b) is performed by mechanical deformation.

6. The method defined in claim 1 wherein said step (b) is performed by electromagnetic pulse forming.

7. The method defined in claim 1 wherein said step (b) is performed by hydroforming.

8. The method defined in claim 1 wherein said step (d) is performed by mechanical deformation.

9. The method defined in claim 1 wherein said step (d) is performed by electromagnetic pulse forming.

10. The method defined in claim 1 wherein said step (d) is performed by hydroforming.

* * * * *